United States Patent
Chun et al.

(10) Patent No.: US 8,681,718 B2
(45) Date of Patent: Mar. 25, 2014

(54) METHOD OF TRANSMITTING ACK/NACK SIGNAL IN WIRELESS COMMUNICATION SYSTEM

(75) Inventors: Jin Young Chun, Anyang-si (KR); Bin Chul Ihm, Anyang-si (KR); Wook Bong Lee, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 953 days.

(21) Appl. No.: 12/743,051

(22) PCT Filed: Nov. 26, 2008

(86) PCT No.: PCT/KR2008/006967
§ 371 (c)(1),
(2), (4) Date: May 14, 2010

(87) PCT Pub. No.: WO2009/069937
PCT Pub. Date: Jun. 4, 2009

(65) Prior Publication Data
US 2010/0265898 A1    Oct. 21, 2010

Related U.S. Application Data

(60) Provisional application No. 60/991,206, filed on Nov. 29, 2007.

(30) Foreign Application Priority Data
Apr. 7, 2008    (KR) .......................... 10-2008-0032239

(51) Int. Cl.
H04W 4/00    (2009.01)

(52) U.S. Cl.
USPC ............ 370/329; 370/335; 370/342; 455/450

(58) Field of Classification Search
USPC ................. 370/203, 329, 335, 342; 455/63.1, 455/67.11, 450; 375/130, 211, 260
See application file for complete search history.

(56) References Cited

U.S. PATENT DOCUMENTS

| | | | |
|---|---|---|---|
| 6,545,997 | B1 | 4/2003 | Bohnke et al. |
| 7,185,256 | B2 | 2/2007 | Miki et al. |
| 2002/0136174 | A1 | 9/2002 | Gleeson |
| 2004/0190482 | A1 | 9/2004 | Baum et al. |
| 2005/0195732 | A1* | 9/2005 | Huh et al. ................. 370/206 |

(Continued)

FOREIGN PATENT DOCUMENTS

| | | |
|---|---|---|
| KR | 10-0606099 | 7/2006 |
| KR | 10-2007-0080191 | 8/2007 |
| WO | WO 2007/083569 | 7/2007 |

*Primary Examiner* — Awet Haile
(74) *Attorney, Agent, or Firm* — McKenna Long & Aldridge LLP (57) ABSTRACT

A method of transmitting an ACK/NACK signal via an ACK/NACK channel including one or more tiles comprised of a plurality of OFDM symbols in a time domain and a plurality of subcarriers in a frequency domain in a wireless communication system includes generating a first codeword by applying a first spreading code to data symbols and pilot symbols, wherein the tile includes a plurality of data subcarriers and a plurality of pilot subcarriers, the data symbols are allocated to the plurality of data subcarriers and the pilot symbols are allocated to the plurality of pilot subcarriers, generating a second codeword by allocating data symbols applied a second spreading code to the plurality of data subcarriers, and transmitting the first and second codewords.

2 Claims, 4 Drawing Sheets

(56) References Cited

U.S. PATENT DOCUMENTS

| | | |
|---|---|---|
| 2005/0286402 A1* | 12/2005 | Byun et al. .................. 370/203 |
| 2005/0286408 A1 | 12/2005 | Jin et al. |
| 2006/0285479 A1* | 12/2006 | Han et al. .................... 370/203 |
| 2007/0009054 A1 | 1/2007 | Kwak et al. |
| 2007/0058595 A1 | 3/2007 | Classon et al. |
| 2007/0153929 A1 | 7/2007 | Ballentin et al. |
| 2007/0165731 A1 | 7/2007 | Xiao et al. |
| 2007/0183384 A1 | 8/2007 | Kwak et al. |
| 2007/0195899 A1 | 8/2007 | Bhushan et al. |
| 2007/0206558 A1 | 9/2007 | Akita et al. |
| 2007/0217362 A1 | 9/2007 | Kashima et al. |
| 2007/0223364 A1 | 9/2007 | Terabe et al. |
| 2007/0242636 A1 | 10/2007 | Kashima et al. |
| 2007/0258404 A1 | 11/2007 | Tirkkonen et al. |
| 2007/0268816 A1 | 11/2007 | Hosein |
| 2008/0070632 A1 | 3/2008 | Obuchi et al. |
| 2008/0141093 A1* | 6/2008 | Kwon et al. ................ 714/749 |
| 2008/0167040 A1 | 7/2008 | Khandekar et al. |
| 2009/0052381 A1* | 2/2009 | Gorokhov et al. ............ 370/329 |
| 2009/0129362 A1 | 5/2009 | Higuchi et al. |
| 2009/0209256 A1 | 8/2009 | Nakashima et al. |
| 2009/0232062 A1 | 9/2009 | Higuchi et al. |
| 2009/0245197 A1 | 10/2009 | Ma et al. |
| 2009/0262699 A1 | 10/2009 | Wengerter et al. |
| 2010/0177715 A1 | 7/2010 | Ofuji et al. |
| 2011/0065468 A1 | 3/2011 | Parkvall et al. |

* cited by examiner

| S1*F1 | F1 |
|---|---|
| S1*F2 | F2 |
| S1*F3 | F3 |
| S1*F4 | F4 |

| S1*F1 | F1 |
|---|---|
| S1*F2 | F2 |
| F3 | S1*F3 |
| F4 | S1*F4 |

Fig. 9

| F1 | S1*F1 | F3 |
|---|---|---|
| S1*F2 | S1*F3 | S1*F4 |
| S2*F1 | S2*F2 | S2*F3 |
| F2 | S2*F4 | F4 |

Fig. 10

| F1 | S1*F3 | F3 |
|---|---|---|
| S1*F1 | S1*F4 | S2*F3 |
| S1*F2 | S2*F1 | S2*F4 |
| F2 | S2*F2 | F4 |

Fig. 11

| S1*F1 | F1 | S2*F1 |
|---|---|---|
| S1*F2 | F2 | S2*F2 |
| S1*F3 | F3 | S2*F3 |
| S1*F4 | F4 | S2*F4 |

Fig. 12

| S1*F1 | F1 | F5 | S1*F5 |
|---|---|---|---|
| S1*F2 | F2 | F6 | S1*F6 |
| S1*F3 | F3 | F7 | S1*F7 |
| S1*F4 | F4 | F8 | S1*F8 |

Fig. 13

| S1*F1 | S1*F5 | F1 | F5 | S2*F1 | S2*F5 |
|---|---|---|---|---|---|
| S1*F2 | S1*F6 | F2 | F6 | S2*F2 | S2*F6 |
| S1*F3 | S1*F7 | F3 | F7 | S2*F3 | S2*F7 |
| S1*F4 | S1*F8 | F4 | F8 | S2*F4 | S2*F8 |

Fig. 14

| S1*F1 | F1 | F5 | F9 | S1*F5 | S1*F9 |
|---|---|---|---|---|---|
| S1*F2 | F2 | F6 | F10 | S1*F6 | S1*F10 |
| S1*F3 | F3 | F7 | F11 | S1*F7 | S1*F11 |
| S1*F4 | F4 | F8 | F12 | S1*F8 | S1*F12 |

Fig. 15

| S1*F1 | S1*F5 | F1 | F5 | F9 | S1*F9 |
|---|---|---|---|---|---|
| S1*F2 | S1*F6 | F2 | F6 | F10 | S1*F10 |
| S1*F3 | S1*F7 | F3 | F7 | F11 | S1*F11 |
| S1*F4 | S1*F8 | F4 | F8 | F12 | S1*F12 |

METHOD OF TRANSMITTING ACK/NACK SIGNAL IN WIRELESS COMMUNICATION SYSTEM

This application is a national phase application based on International Application No. PCT/KR2008/006967, filed on Nov. 26, 2008, which claims priority to U.S. Provisional Application No. 60/991,206, filed on Nov. 29, 2007 and Korean Patent Application No. 10-2008-0032239, filed on Apr. 7, 2008, all of which are incorporated by reference for all purposes as if fully set forth herein.

TECHNICAL FIELD

The present invention relates to wireless communications and, more particularly, to a method for transmitting an ACK/NACK (Acknowledgement/Non-acknowledgement) signal.

BACKGROUND ART

An IEEE (Institute of Electrical and Electronics Engineers) 802.16 standards provide techniques and protocols to support a broadband wireless access. Standardization proceeded starting from 1999 and IEEE 802.16-2001 was approved in 2001. It is based on a single carrier physical layer called 'WirelessMAN-SC'. Later, besides the 'WirelessMAN-SC', 'WirelessMAN-OFDM' and 'WirelessMAN-OFDMA' were added to the physical layer in IEEE 802.16a standards approved in 2003. After the IEEE 802.16a standards were completed, revised IEEE 802.16-2004 standards were approved in 2004. IEEE 802.16-2004/Cor1 was completed in the form of 'corrigendum' in 2005 in order to resolve and correct bugs and errors of the IEEE 802.16-2004 standards.

One of systems considered in the next generation is an OFDM (Orthogonal Frequency Division Multiplexing) system that can attenuate an inter-symbol interference effect with a low complexity. The OFDM converts serially inputted data symbols into the N number of parallel data symbols, carries them in the N number of separated subcarriers, and transmits the same. The subcarriers maintain orthogonality in a frequency domain. The respective orthogonal channels experience mutually independent frequency selective fading, and the intervals of transmitted symbols are lengthened to minimize the inter-symbol interference. OFDMA refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, resultantly, frequency resources are mutually exclusively allocated to the users.

In the OFDMA system, frequency diversity can be obtained for multiple users through frequency selective scheduling, and subcarriers can be allocated in various forms according to permutation with respect to the subcarriers. The efficiency of a space domain can be enhanced according to a space multiplexing scheme using multiple antennas. In order to support such various schemes, a control signal should be necessarily transmitted between a UE (user equipment (UE)) and a base station. In particular, as an HARQ (Hybrid-Automatic Repeat Request) scheme obtained by combining an FEC (Forward Error Correction) scheme and an ARQ scheme is used as an error compensation scheme to ensure reliability of communication, control signals such as a response to a data transmission, re-transmission request, or the like, are frequently transmitted. With the limited radio resources, the more the control signals are transmitted, the more radio resources that can be allocated for data transmission are reduced.

Thus, a method for effectively using limited radio resources by reducing the amount of radio resources allocated for the control signals is required.

DISCLOSURE OF INVENTION

Technical Problem

Therefore, an object of the present invention is to provide a method for effectively transmitting an ACK/NACK (Acknowledgement/Non-acknowledgement) signal to effectively use limited radio resources.

Technical Solution

In an aspect, a method of transmitting an ACK/NACK signal via an ACK/NACK channel including one or more tiles comprised of a plurality of OFDM symbols in a time domain and a plurality of subcarriers in a frequency domain in a wireless communication system includes generating a first codeword by applying a first spreading code to data symbols and pilot symbols, wherein the tile includes a plurality of data subcarriers and a plurality of pilot subcarriers, the data symbols are allocated to the plurality of data subcarriers and the pilot symbols are allocated to the plurality of pilot subcarriers, generating a second codeword by allocating data symbols applied a second spreading code to the plurality of data subcarriers, and transmitting the first and second codewords.

In another aspect, a method of transmitting a control signal in a wireless communication system includes transmitting a first control signal via a control channel including at least one tile comprised of a plurality of data subcarriers and a plurality of pilot subcarriers, and multiplexing a second control signal into the first control signal and transmitting the same, wherein a first spreading code with a length corresponding to the number of the pilot subcarriers is applied to the first control signal, and a second spreading code, which has a length corresponding to the number of the pilot subcarriers and is orthogonal to the first spreading code, is applied to the second control signal.

Advantageous Effects

In the present invention, an ACK/NACK signal or a plurality of ACK/NACK signals with respect to multiple users can be transmitted via a single ACK/NACK channel, so the limited radio resources can be effectively used.

MODE FOR THE INVENTION

Figure 1:
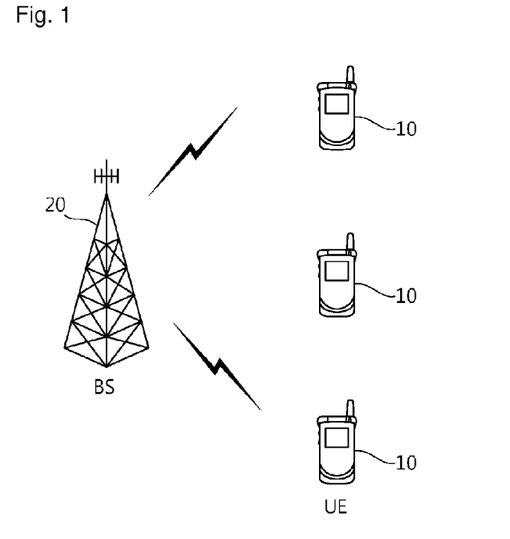
FIG. 1 shows an example of a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and user equipments (UEs) 10. The UEs 10 may be fixed or have mobility, and may be referred to as another terminology, such as a mobile station (MS), a user terminal (UT), a subscriber station (SS), a wireless device, etc. The BS 20 generally refers to a fixed station that communicates with the UEs 10 and may be called another terminology, such as a node-B, a base transceiver system (BTS), an access point, etc. There are one or more cells within the coverage of the BS 20.

Hereinafter, downlink refers to communication from the BS 20 to the UEs 10, and uplink refers to communication from the UEs 10 to the BS 20. In the downlink, a transmitter may be a part of the BS 20, and a receiver may be a part of the UEs 10. In the uplink, a transmitter may be a part of the UEs 10, and a receiver may be a part of the BS 20.

The wireless communication system may be an OFDM (Orthogonal Frequency Division Multiplexing)/OFDMA (Orthogonal Frequency Division Multiple Access)-based system. The OFDM uses a plurality of orthogonal subcarriers. The OFDM uses orthogonality between IFFT (Inverse Fast Fourier Transform) and FFT (Fast Fourier Transform). The transmitter performs IFFT on data and transmits the same. The receiver performs FFT on a reception signal to restore the original data. The transmitter uses IFFT to combine multiple subcarriers, and the receiver uses corresponding FFT to separate the multiple subcarriers.

Figure 2:
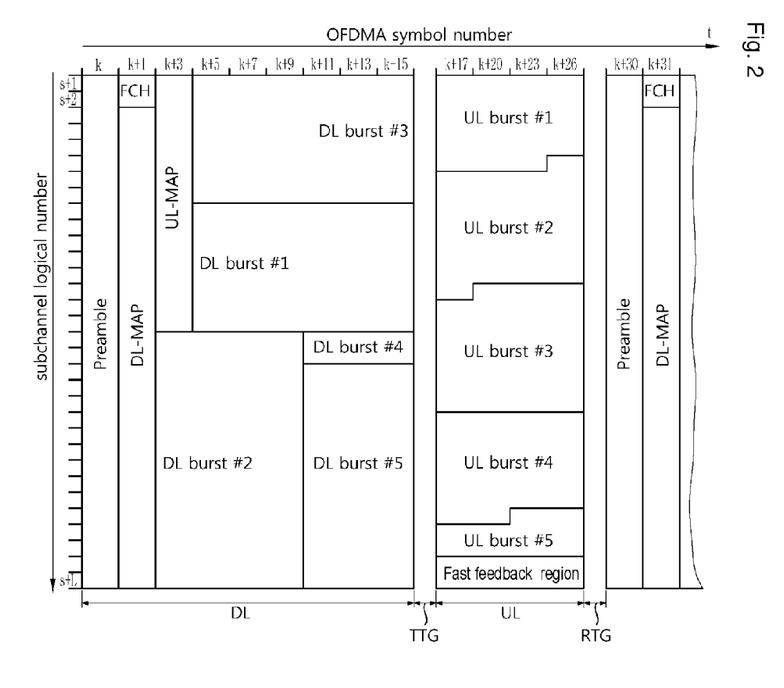
FIG. 2 is a drawing illustrating an example of a frame structure.

FIG. 2 shows an example of a frame structure. The frame refers to a data sequence during a fixed time period used according to physical specifications. It may refer to 8.4.4.2 paragraph of "Part 16: Air Interface for Fixed Broadband Wireless Access Systems" of IEEE standards 802.16-2004 (referred to as 'Reference document 1', hereinafter).

Referring to FIG. 2, the frame includes a downlink frame and an uplink frame. Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL (Downlink)-MAP, a UL (Uplink)-MAP, a burst region, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between the downlink burst and the subsequent uplink burst. A receive/transmit transition gap (RTG) refers to a gap between the uplink burst and a subsequent downlink burst.

The preamble is used for initial synchronization, cell search, frequency offset, and channel estimation between a BS and a UE. The FCH includes the length of a DL-MAP message and coding information of the DL-MAP message.

The DL-MAP is a region on which the DL-MAP message is transmitted. The DL-MAP message defines an access of a downlink channel. The DL-MAP message includes a configuration change count of a DCD (Downlink Channel Descriptor) and a base station ID (Identifier). The DCD describes a downlink burst profile applied to a current map. The downlink burst profile refers to characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a UCD (Uplink Channel Descriptor) and a valid start time of uplink allocation defined by the UL-MAP. The UCD describes an uplink burst profile. The uplink burst profile refers to characteristics of an uplink physical channel, and the UCD is periodically transmitted by the base station via a UCD message.

A portion of the uplink frame includes a fast feedback region. The fast feedback region, which is a region allocated for a faster uplink transmission than general uplink data, may include various information such as a CQI, an ACK/NACK signal, or the like. The fast feedback region may be positioned anywhere in the uplink frame, without being limited to the position or size as illustrated in FIG. 2.

Hereinafter, a slot is a minimum available data allocation unit and defined as time and a subchannel. The number of subchannels depends upon the size of FFT and time-frequency mapping. Subchannels include a plurality of subcarriers. The number of subcarriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps. In a first step, data is mapped to at least one data slot in at least one logical subchannel. In a second step, each logical subchannel is mapped to physical subcarriers. This is called permutation. The reference document 1 discloses permutations such as FUSC, PUSC, O-FUSC (Optional-FUSC), O-PUSC (Optional-PUSC), AMC (Adaptive Modulation and Coding), or the like. A set of OFDM symbols using the same permutation is called a permutation zone, and a single frame includes at least one permutation zone.

The FUSC and the O-FUSC are used only for downlink transmission. The FUSC includes a single segment including every subchannel group. Each subchannel is mapped to a physical subcarrier distributed in the entire physical channels. This mapping changes for each OFDM symbol. A slot includes a single subchannel in a single OFDM symbol. The O-FUSC has a different pilot allocation method from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, each subcarrier may include a plurality of tiles including four contiguous physical subcarriers on three OFDM symbols. Each subchannel includes six tiles. Pilot is allocated to corners of each tile. The O-PUSC is used only for uplink transmission, and each tile includes three continuous physical subcarriers on three OFDM symbols. Pilot is allocated to the center of each tile.

Figure 3:
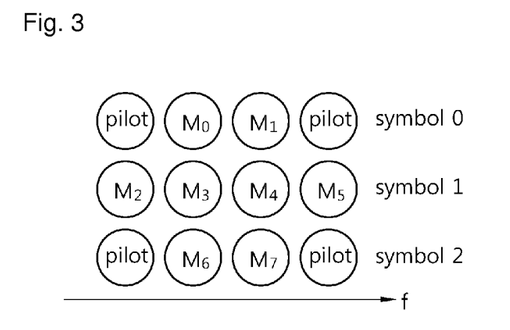
FIG. 3 shows an example of a tile in PUSC.

FIG. 3 shows an example of a tile in the PUSC.

Referring to FIG. 3, a single tile includes four subcarriers in a frequency domain and three OFDM symbols in a time domain, totaling twelve subcarriers. The twelve subcarriers may be divided into eight data subcarriers (M0, . . . , M7) and four pilot subcarriers. The data subcarriers carry (include) data symbols. The data symbols may be symbols with respect to user data or a control signal. The pilot subcarriers may carry pilot or 'Null'. In order to utilize the pilot subcarriers, other data symbols may be carried in the pilot subcarriers and transmitted. In uplink, subchannels in the PUSC include 48 data subcarriers and 24 pilot subcarriers.

Figure 4:
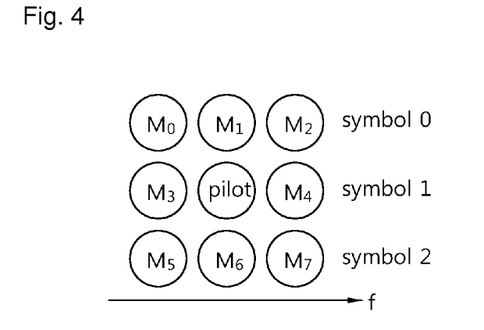
FIG. 4 shows an example of a tile in optional PUSC.

FIG. 4 shows an example of a tile in optional PUSC.

Referring to FIG. 4, a single tile includes three subcarriers in the frequency domain and three OFDM symbols in the time domain, totaling nine subcarriers. Nine subcarriers may be divided into eight data subcarriers ($M_0$, . . . , $M_7$) and one pilot subcarrier.

Figure 5:
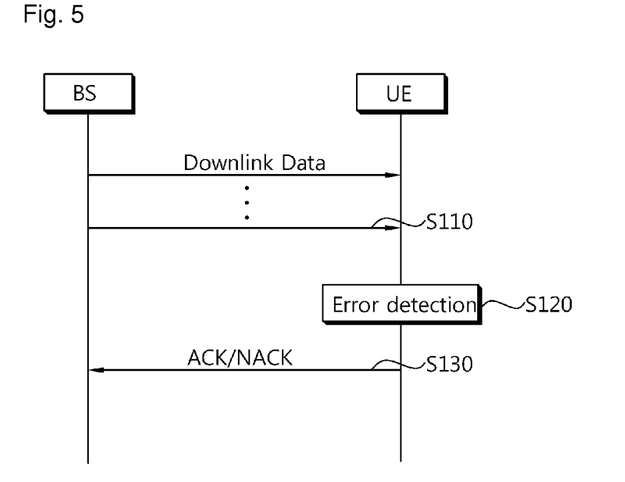
FIG. 5 is a flow chart illustrating the process of a method for transmitting data using HARQ according to an embodiment of the present invention.

FIG. 5 is a flow chart illustrating the process of a method for transmitting data using HARQ according to an embodiment of the present invention.

Referring to FIG. 5, the BS transmits downlink data (S110). The UE receives the downlink data, decodes it, and detects whether or not there is an error (S120). If no error is detected, the UE transmits an ACK (Acknowledgement) signal, whereas if an error is detected, the UE transmits a NACK (Not-Acknowledgement) signal (S130). In this case, the BS may allocate radio resources to allow the UE to transmit the ACK/NACK signal. The fast feedback region may be allocated for the ACK/NACK channel. The channel for transmitting the ACK/NACK signal is called an ACK/NACK channel. The ACK/NACK channel may be allocated a 1/2 subchannel (three tiles). The ACK/NACK channel may use the PUSC permutation or the optional PUSC permutation.

The ACK/NACK signal may be mapped to data subcarriers of each tile. Table 1 shows modulation symbols carried on the eight data subcarriers included in a single tile. A single modulation symbol is carried on a single subcarrier, and eight modulation symbols carried on the single tile form a single vector. All the eight types of vectors are configured, which have index values of 0 to 7.

TABLE 1

| Vector index | Data subcarrier modulation per Codeword-Subcarrier(0), Subcarrier(1), . . . Subcarrier(7) |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P2, P0, P0, P2, P2, P0 |
| 7 | P0, P2, P2, P0, P2, P0, P0, P2 | wherein modulation symbols of each vector are expressed by equation 1 shown below. P(0), P(1), P(2), and P(3) indicate phases of symbols in a constellation map and used in a QPSK (Quadrature Phase Shift Keying) modulation scheme.

MathFigure 1

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Math. 1]

In this case, the vectors having different indexes are orthogonal to each other.

When payload with respect to the ACK/NACK signal is 1 bit (e.g., 0 in case of ACK and 1 in case of NACK), vectors allocated to the ACK/NACK channel can be expressed as shown in Table 2.

TABLE 2

| ACK 1-bit symbol | Vector indices per Tile - Tile(0), Tile(1), Tile(2) |
| --- | --- |
| 0 | 0, 0, 0 |
| 1 | 4, 7, 2 |

Because the ACK/NACK channel is allocated the 1/2 subchannel, three tiles are allocated to the single ACK/NACK CHANNEL. One vector is required for expressing a single file, so three vectors are required for expressing the ACK/NACK signal. An ACK/NACK signal mapped to the ACK/NACK channel and expressed in the form of vector is called a codeword of the ACK/NACK signal. Table 2 shows an example of combination of vectors per payload. There is no limitation in the combinations of vectors and a skilled person in the art would easily modify them.

When the BS receives an ACK signal in response to downlink data, the BS transmits the downlink data, and if the BS receives the NACK signal, the BS transmits re-transmission data. The re-transmission data may be the same as the original downlink data or may be different according to an HARQ. The BS may attempt re-transmissions by a pre-determined number of times.

The transmitter that performs the HARQ may perform a plurality of HARQ processors in a parallel manner to transmit the m number of transmission blocks via a single frame, and the receiver may respond with the m (m>1 and integer) number of ACK/NACK signals with respect to the m number of transmission blocks. The BS, which transmits data to multiple users, receives a plurality of ACK/NACK signals from the multiple users. In the system in which the plurality of ACK/NACK signals are transmitted according to the HARQ, allocation of one ACK/NACK channel (1/2 subchannel) to one ACK/NACK signal causes a waste of limited radio resources. For example, if the BS transmits 10 transmission blocks to one user, the BS should five sub-channels to the user to receive the ACK/NACK signal. Also, if the BS transmits one transmission block to each of ten users, the BS should allocate five subchannels to receive the ACK/NACK signals from the ten users. As the number of transmitted data is increased, the number of ACK/NACK signals is also increased, resulting in the increase in the usage amount of radio resources by the ACK/NACK signals. There is a limitation in the radio resources to be allocated for the ACK/NACK signals.

Thus, a method for effectively transmitting a plurality of ACK/NACK signals is required. For this purpose, the BS allocates a single ACK/NACK channel to a plurality of ACK/NACK signals, rather than allocating a single ACK/NACK channel to a single ACK/NACK signal. The plurality of ACK/NACK signal may be ACK/NACK signals of a plurality of users or may be an ACK/NACK signal of a single user. Namely, the BS allocates the single ACK/NACK channel to the plurality of users and make ACK/NACK signals of the plurality of users multiplexed to the single ACK/NACK channel, or allocates a single ACK/NACK channel to a single user to allow the single user to multiplex a plurality of ACK/NACK signals into the single ACK/NACK channel and transmit the same.

The method for effectively transmitting a plurality of ACK/NACK signals with the limited radio resources will be described as follows.

Figure 6:
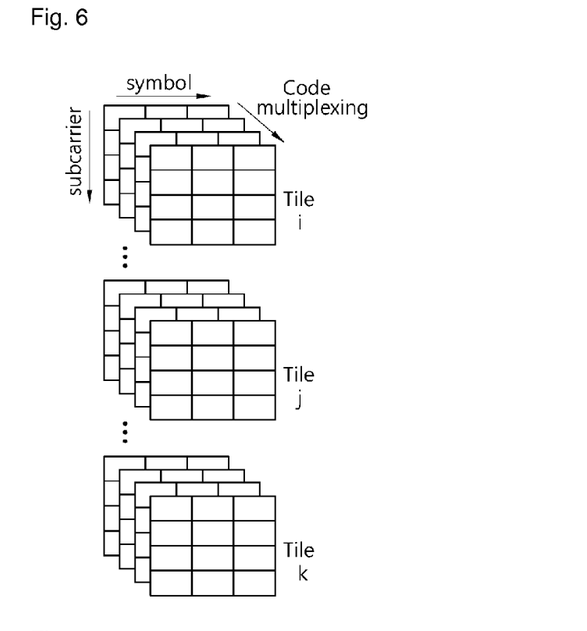
FIG. 6 shows a method for multiplexing a control signal according to an embodiment of the present invention.

FIG. 6 shows a method for multiplexing a control signal according to an embodiment of the present invention.

Referring to FIG. 6, a code multiplexing scheme is employed to multiplex a plurality of ACK/NACK signals into a single ACK/NACK channel. Mutually orthogonal codes are multiplied to each ACK/NACK signal to multiple each ACK/NACK signal into the single ACK/NACK channel.

It is assumed that the ACK/NACK channel includes three tiles (i, j, and k). Each tile is shown to include three OFDM symbols in the time domain and four subcarriers in the frequency domain, but the structure of the tiles may be modified variably without being limited thereto. Also, the positions of the tiles may be applied to any of uplink OFDMA structures. Each tile includes at least one pilot subcarrier and a plurality of data subcarriers. A pilot symbol is allocated to the pilot subcarrier. The pilot symbol may be defined for coherent detection. The coherent detection is a method of performing channel estimation using pilot and then obtaining data carried in the data subcarrier.

Each tile is allocated a plurality of spreading factor-applied ACK/NACK signals. The spreading codes discriminate the plurality of ACK/NACK signals. The spreading codes spread the ACK/NACK signals in the time domain or in the frequency domain. As the spreading code, orthogonal codes such as the well known Hadamard code, a DFT sequence, a Walsh code, a Zadoff-Chu (ZC) CAZAC (Constant Amplitude Zero Auto-Correlation) sequence, or the like.

The ZC sequence, one of the CAZAC sequences, can be expressed by Equation 2 shown below:

MathFigure 2

$$c(k) = \exp\left\{-\frac{j\pi Mk(k+1)}{N}\right\}, \text{ when } N \text{ is odd number}$$
$$c(k) = \exp\left\{-\frac{j\pi Mk^2}{N}\right\}, \text{ when } N \text{ is even number}$$

[Math. 2]

wherein c(k) is the kth element of the ZC sequence with an index 'M', 'N' is the length of the ZC sequence, the index 'M' is a natural number which is not larger than 'N', and 'M' and 'N' are relatively primes. Each UE may be discriminated by applying ZC sequences each having a different circular shift value. Namely, a plurality of ACK/NACK signals can be discriminated by each different circular shift value. The number of available circular shifts may differ according to a delay spread of channels. This is merely an example, and other sequences with good correlation characteristics may be applicable.

Tiles of various structures in which the plurality of ACK/NACK signals are multiplexed will now be described. The ACK/NACK channel transmitting the ACK/NACK signal may include at least one tile. The tile includes a plurality of OFDM symbols in the time domain and a plurality of subcarriers in the frequency domain.

Figure 7:
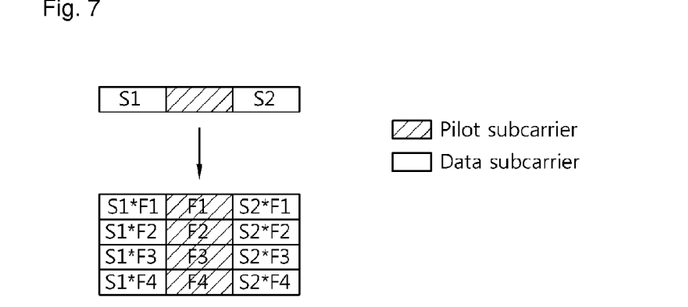
FIG. 7 shows a method for multiplexing a plurality of control signals into tiles by using spreading codes according to an embodiment of the present invention.

FIG. 7 shows a method for multiplexing a plurality of control signals into tiles by using spreading codes according to an embodiment of the present invention. The ACK/NACK channel for transmitting the ACK/NACK signal may include a plurality of tiles, and only one of the plurality of tiles is shown in FIG. 7.

Referring to FIG. 7, it is assumed that the tile includes three OFDM symbols in the time domain and four subcarriers in the frequency domain. A pilot subcarrier is allocated to one of the three OFDM symbols, and data subcarriers may be allocated to the other remaining OFDM symbols. A pilot symbol may be allocated to the pilot subcarrier, and modulation symbols S1 and S2 of the ACK/NACK are allocated to the data subcarrier. The modulation symbols S1 and S2 are modulation symbols of the ACK/NACK signal corresponding to the OFDM symbols. If the radio between the number of OFDM symbols to which pilot subcarriers are allocated and the number of OFDM symbols to which data subcarriers are allocated is 1:n, the 'n' number of modulation symbols of the ACK/NACK signal may be allocated to the tiles (n≥1 and integer). Namely, if the ratio between the number of the pilot subcarriers and that of the data subcarriers is 1:n, the 'n' number of modulation symbols of the ACK/NACK signal can be allocated to the tiles. For example, if the ACK/NACK signal is transmitted via three tiles, the ACK/NACK signal is expressed by six modulation symbols, and the six modulation symbols are allocated by twos to each tile.

The modulation symbols of the ACK/NACK signal allocated to each OFDM symbol are spread in the frequency domain by using a frequency domain spreading code. As the frequency domain spreading code, an orthogonal code such as the ZC sequence may be used. Frequency domain spreading codes F1, F2, F3, and F4 with a length of 4 may be used for four subcarriers of the tile. The frequency domain spreading code with a length of 4 which has been applied for the data subcarriers may be also applicable to the pilot symbol. The length of the spreading code may correspond to the number of pilot subcarriers.

If modulations symbols (e.g., S3 and S4) of a different ACK/NACK signal are applied to the tile to which the modulation symbols S1 and S2 have been allocated, the ACK/NACK signal is multiplexed by employing different spreading codes. For example, if the ZC sequence is used as the spreading code for the modulation symbols S1 and S2, ZC sequences having different circular shift values are applied for the modulation symbols S3 and S4, thereby discriminating the modulation symbols. The spreading code applied for the modulation symbols S1 and S2 and that applied for the modulation symbols S3 and S4 are mutually orthogonal, so as not to be interfered with each other.

Spreading codes by the number of pilot symbols may be used in a single tile. In the coherent detection, constellation of the ACK/NACK signals is discriminated based on defined pilot symbols. If there are four pilot symbols in the single tile, maximum four frequency domain spreading codes may be used for the coherent detection. Accordingly, if the tile includes the 'k' number of pilot subcarriers, maximum 'k' number of ACK/NACK signals can be transmitted via the ACK/NACK channel. (k≥1 and integer). Here, because four pilot symbols are included in the tile, four spreading codes may be applied, and four ACK/NACK signals can be transmitted via the ACK/NACK channel.

The structure of the tile constituting the ACK/NACK channel may change variably in the time domain or in the frequency domain, and the number and positions of the subcarriers included in the tile may change variably. Thus, the number of ACK/NACK signals that can be transmitted via the ACK/NACK channel may vary.

Figure 8:
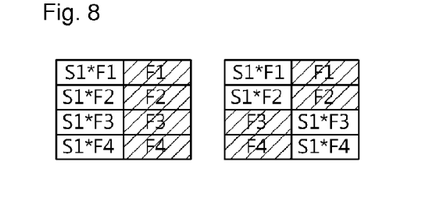
FIG. 8 shows tiles according to one embodiment of the present invention.

FIG. 8 shows tiles according to one embodiment of the present invention.

Referring to FIG. 8, tiles include two OFDM symbols in the time domain and four subcarriers in the frequency domain. A data subcarrier may be allocated to one OFDM symbol and a pilot subcarrier may be allocated to another OFDM symbol. If the tiles include four data subcarriers and four pilot subcarriers, the pilot subcarriers may be distributedly allocated by twos to the mutually different OFDM symbols. Hereinafter, it is assumed that when a data subcarrier is allocated to one OFDM symbol and a pilot subcarrier is allocated to another OFDM symbol, the pilot subcarrier may be distributedly allocated to the OFDM symbol to which the data subcarrier has been allocated.

An ACK/NACK channel may include one or more of such tiles. The plurality of tiles constituting the ACK/NACK channel may be arranged in the time domain or in the frequency domain.

Because the ratio between the number of OFDM symbols to which the pilot subcarriers are allocated and the number of OFDM symbols to which the data subcarriers are allocated is 1:1 and the number of pilot subcarriers is 4, one modulation symbol of an ACKNACK signal may be allocated to a single tile and maximum four ACK/NACK signals may be multiplexed and transmitted via the ACK/NACK channel.

Figure 9:
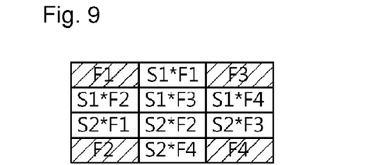
FIG. 9 shows tiles according to another embodiment of the present invention.

FIG. 9 shows tiles according to another embodiment of the present invention.

Referring to FIG. 9, a tile includes three OFDM symbols in the time domain and four subcarriers in the frequency domain. Four pilot subcarriers are allocated to corner portions of the tile, so the tile includes eight data subcarriers and four pilot subcarriers. In the eight data subcarriers, first modulation symbols S1 of an ACK/NACK signal are allocated to two data subcarriers contiguous in the frequency domain, and second modulation symbols S2 of the ACK/NACK signal are allocated to the other remaining two contiguous data subcarriers. In this case, spreading codes F1, F2, F3, and F4 with the length of 4 are applied to each modulation symbol according to the number of pilot subcarriers. An ACK/NACK channel may include one or more of such tile. A plurality of tiles constituting the ACK/NACK channel may be arranged in the time domain or in the frequency domain.

In the tile with such a structure, a plurality of ACK/NACK signals can be multiplexed by using spreading codes by corresponding to the number of the pilot subcarriers. Because the number of pilot subcarriers is 4, maximum four ACK/NACK signals may be multiplexed and transmitted via the ACK/NACK channel.

Figure 10:
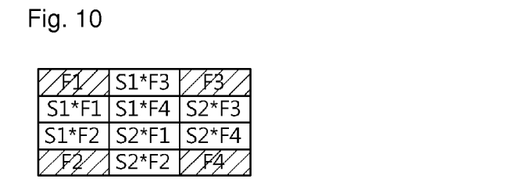
FIG. 10 shows tiles according to still another embodiment of the present invention.

FIG. 10 shows tiles according to still another embodiment of the present invention.

Referring to FIG. 10, a tile includes three OFDM symbols in the time domain and four subcarriers in the frequency domain. Four pilot subcarriers are allocated to corner portions of the tile, so the tile includes eight data subcarriers and four pilot subcarriers. In the eight data subcarriers, first modulation symbols S1 of an ACK/NACK signal are allocated to four subcarriers preferentially in the frequency domain, and second modulation symbols S2 of the ACK/NACK signal are allocated to the other remaining four data subcarriers. In this case, spreading codes F1, F2, F3, and F4 with the length of 4 are applied to each modulation symbol according to the number of pilot subcarriers. An ACK/NACK channel may include one or more of such tile. A plurality of tiles constituting the ACK/NACK channel may be arranged in the time domain or in the frequency domain.

Because the number of pilot subcarriers is 4, maximum four ACK/NACK signals may be multiplexed and transmitted via the ACK/NACK channel.

Figure 11:
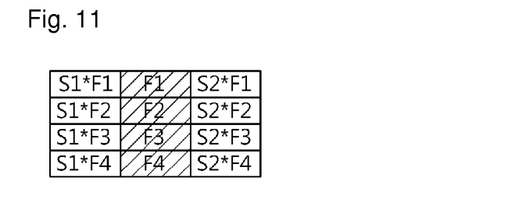
FIG. 11 shows tiles according to still another embodiment of the present invention.

FIG. 11 shows tiles according to still another embodiment of the present invention.

Referring to FIG. 11, a tile includes three OFDM symbols in the time domain and four subcarriers in the frequency domain. A pilot subcarrier is allocated to a single OFDM symbol, and data subcarriers are allocated to the other two remaining OFDM symbols. Because the ratio between the number of OFDM symbols to which the pilot subcarriers are allocated and the number of OFDM symbols to which the data subcarriers are allocated is 1:2 and the number of pilot subcarriers is 4, two modulation symbols of an ACK/NACK signal are allocated to one tile and maximum four ACK/NACK signals may be multiplexed and transmitted via an ACK/NACK channel.

Figure 12:
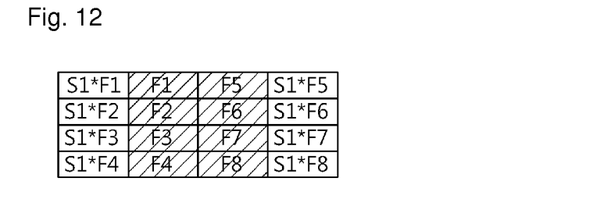
FIG. 12 shows tiles according to still another embodiment of the present invention.

FIG. 12 shows tiles according to still another embodiment of the present invention.

Referring to FIG. 12, a tile includes four OFDM symbols in the time domain and four subcarriers in the frequency domain. Pilot subcarriers are allocated to two OFDM symbols and data subcarriers are allocated to the other two remaining OFDM symbols. Because the number of OFDM symbols to which the pilot subcarriers are allocated and the number of OFDM symbols to which the data subcarriers are allocated is 1:1 and the number of pilot subcarriers is 8, one modulation symbol of an ACK/NACK signal is allocated to one tile and maximum eight ACK/NACK signals are multiplexed and transmitted via an ACK/NACK channel.

Figure 13:
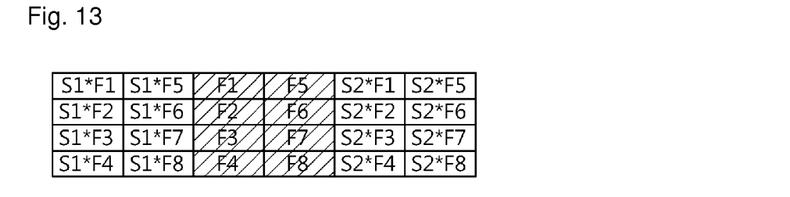
FIG. 13 shows tiles according to still another embodiment of the present invention.

FIG. 13 shows tiles according to still another embodiment of the present invention.

Referring to FIG. 13, a tile includes six OFDM symbols in the time domain and four subcarriers in the frequency domain. Pilot subcarriers are allocated to two OFDM symbols and data subcarriers are allocated to the other remaining four OFDM symbols. Because the ratio between the number of OFDM symbols to which pilot subcarriers are allocated and the number of OFDM symbols to which data subcarriers are allocated is 1:2 and the number of pilot subcarriers is 8, two modulation symbols of an ACK/NACK signal are allocated to one tile and maximum eight ACK/NACK signals are multiplexed and transmitted via an ACK/NACK channel.

Figure 14:
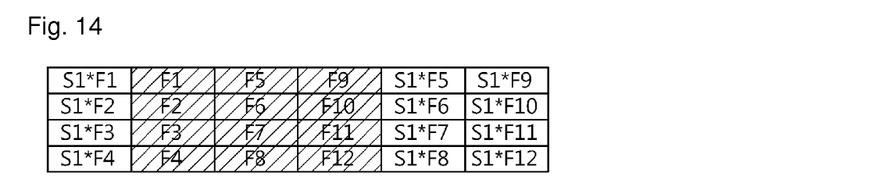
FIG. 14 shows tiles according to still another embodiment of the present invention.

FIG. 14 shows tiles according to still another embodiment of the present invention.

Referring to FIG. 14, a tile includes six OFDM symbols in the time domain and four subcarriers in the frequency domain. Pilot subcarriers are allocated to three OFDM symbols and data subcarriers are allocated to the other remaining three OFDM symbols. Because the ratio between the number of OFDM symbols to which the pilot subcarriers are allocated and the number of OFDM symbols to which data subcarriers are allocated is 1:1 and the number of pilot subcarriers is 12, one modulation symbol of an ACK/NACK signal is allocated to one tile and twelve ACK/NACK signals are multiplexed and transmitted via an ACK/NACK channel.

Figure 15:
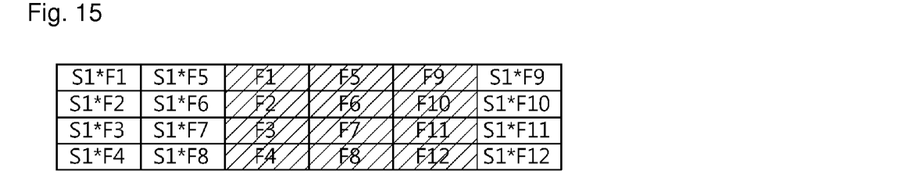
FIG. 15 shows tiles according to still another embodiment of the present invention.

FIG. 15 shows tiles according to still another embodiment of the present invention.

Referring to FIG. 15, a tile includes six OFDM symbols in the time domain and four subcarriers in the frequency domain. Pilot subcarriers are allocated to three OFDMA symbols and data subcarriers are allocated to the other remaining three OFDM symbols. The pilot subcarriers are allocated to the OFDM symbols at different positions from those of the tile in FIG. 14. Regardless of the positions of the OFDM symbols to which the pilot subcarriers are allocated, the same number of ACK/NACK signals as that of the case shown in FIG. 14 may be multiplexed to a single ACK/NACK channel. Because the number of OFDMA symbols to which the pilot subcarriers are allocated and the number of OFDM symbols to which the data subcarriers are allocated is 1:1 and the number of pilot subcarriers is 12, one modulation symbol of an ACK/NACK signal is allocated to one tile and twelve ACK/NACK signals can be multiplexed and transmitted via an ACK/NACK channel.

The downlink HARQ scheme has been described, but the technical idea of the present invention can be also applicable as it is to an uplink HARQ scheme. The positions of the OFDM symbols to which pilot subcarriers are allocated in the structures of the tiles as described above are not limited but arbitrary positions may be allocated in the tiles. The pilot subcarriers may be distributedly positioned in the tile as shown in FIGS. 9 and 10, rather than being allocated to a single OFDM symbol. In the proposed ACK/NACK signal multiplexing method, the number of ACK/NACK signals that can be multiplexed is determined according to the number of pilot subcarriers regardless of the positions of the pilot subcarriers. The method for transmitting a plurality of ACK/NACK signals via a single ACK/NACK channel has been described, which is, however, merely an example, and a plurality of control signals may be multiplexed and transmitted via a single channel according to the proposed method. For example, spreading codes may be applied to a plurality of CQIs to transmit the plurality of CQIs via a CQI channel, or mutually different spreading codes may be applied to a CQI and an ACK/NACK signal in a single control channel, which are then multiplexed.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting an ACK/NACK signal via an ACK/NACK channel including one or more tiles comprised of a plurality of OFDM symbols in a time domain and a plurality of subcarriers in a frequency domain in a wireless communication system, the method comprising:
   generating a first codeword by applying a first spreading code to data symbols and pilot symbols,
   wherein the tile includes a plurality of data subcarriers and a plurality of pilot subcarriers, the data symbols are allocated to the plurality of data subcarriers and the pilot symbols are allocated to the plurality of pilot subcarriers,
   wherein when the ratio between the number of pilot subcarriers and the number of data subcarriers is 1:n, n number of modulation symbols of an ACK/NACK signal are allocated to the tile, n>=1 and integer;
   when the number of pilot subcarriers included in the tile is k, k number of ACK/NACK signals are multiplexed in the tile; and
   generating a second codeword by allocating data symbols applied a second spreading code to the plurality of data subcarriers,
   wherein the first and second codewords are codewords for different ACK/NACK signals; and
   transmitting the first and second codewords.

2. The method of claim 1, wherein the lengths of the first and second codewords correspond to the number of the pilot subcarriers included in the tile.

* * * * *